(12) United States Patent
Tune et al.

(10) Patent No.: US 12,181,967 B2
(45) Date of Patent: Dec. 31, 2024

(54) PATROL SCRUBBING CYCLE FOR DATA STORAGE CIRCUITRY

(71) Applicant: Arm Limited, Cambridge (GB)

(72) Inventors: Andrew David Tune, Dronfield (GB); Cyrille Nicolas Dray, Antibes (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/119,389

(22) Filed: Mar. 9, 2023

(65) Prior Publication Data

US 2024/0303156 A1 Sep. 12, 2024

(51) Int. Cl.
*G06F 11/10* (2006.01)

(52) U.S. Cl.
CPC ...... *G06F 11/1068* (2013.01); *G06F 2201/82* (2013.01)

(58) Field of Classification Search
CPC .......................... G06F 2201/82; G06F 11/1068
See application file for complete search history.

(56) References Cited

U.S. PATENT DOCUMENTS

| | | | | |
|---|---|---|---|---|
| 2017/0161142 A1* | 6/2017 | Reed | ................... | G06F 11/1068 |
| 2018/0173588 A1* | 6/2018 | Bacchus | .............. | G06F 11/106 |
| 2018/0373850 A1* | 12/2018 | Morgan | ................ | G06F 12/145 |
| 2021/0325954 A1* | 10/2021 | Guim Bernat | ........ | G06F 1/3228 |
| 2021/0382640 A1* | 12/2021 | Mandava | .............. | G06F 9/4403 |

OTHER PUBLICATIONS

Wu, H., et al, "First Experimental Demonstration of MRAM Data Scrubbing: 80 Mb MRAM with 40 nm junctions for Last Level Cache Applications" In 2021 IEEE International Electron Devices Meeting (IEDM), IEEE, Dec. 11-16, 2021, 4 pages.
Avalanche Technology. "Data Endurance, Retention and Field Immunity in STT-MRAM" AN000002 Revision C https://www.avalanche-technology.com/document-page/an000002-avalanchestt-mram-device-characteristics-and-capabilities/, 9 pages.

(Continued)

*Primary Examiner* — Guy J Lamarre
(74) *Attorney, Agent, or Firm* — NIXON & VANDERHYE P.C.

(57) ABSTRACT

Data storage circuitry has entries to store data according to a data storage technology supporting non-destructive reads, each entry associated with an error checking code (ECC) and age indication. Scrubbing circuitry performs a patrol scrubbing cycle to visit each entry of the data storage circuitry within a scrubbing period. On a given visit to a given entry, the scrubbing operation comprises determining, based on the age indication associated with the given entry, whether a check-not-required period has elapsed for the given entry, and if so performing an error check on the data of the given entry using the ECC for that entry. The error check is omitted if the check-not-required period has not yet elapsed. The check-not-required period is restarted for a write target entry in response to a request causing an update to the data and the error checking code of the write target entry. The check-not-required period is restarted for a read target entry in response to a request causing the data of a read target entry to be non-destructively read and subject to the error check.

19 Claims, 6 Drawing Sheets

(56) References Cited

OTHER PUBLICATIONS

Li, Qingan, et al. "Compiler-assisted refresh minimization for volatile STT-RAM cache." IEEE Transactions on Computers, vol. 6, No. 8, Aug. 2015, pp. 2169-2181.
Smullen, Clinton W., et al. "Relaxing non-volatility for fast and energyefficient STT-RAM caches." 2011 IEEE 17th International Symposium on High Performance Computer Architecture, IEEE, Feb. 12-16, 2011, 12 pages.
Del Bel, Brandon, et al. "Improving STT-MRAM density through multibit error correction." 2014 Design, Automation & Test in Europe Conference & Exhibition (Date), IEEE, Mar. 24-28, 2014, 6 pages.
Li, Qingan, et al. "Compiler-assisted refresh minimization for volatile STT-RAM cache." IEEE Transactions on Computers, vol. 64, Issue 8, Sep. 26, 2014, 27 pages.

* cited by examiner

PATROL SCRUBBING CYCLE FOR DATA STORAGE CIRCUITRY

BACKGROUND

Technical Field

The present technique relates to the field of data storage.

Technical Background

A data processing system may have one or more instances of data storage circuitry for storing data (e.g. each instance of the data storage circuitry may be used as a cache or as random access memory within the data processing system). Such data storage circuitry may use one of a variety of different data storage technologies. Examples of data storage technologies include static random access memory (SRAM), dynamic random access memory (DRAM), magnetoresistive random access memory (MRAM), phase change random access memory (PRAM), etc. Selection of which memory storage technology to use for a given data storage unit may depend on the design goals for that unit, as each memory storage technology may have advantages and disadvantages in terms of performance parameters such as the access latency, dynamic energy cost of accessing data stored in the data storage circuitry, static energy cost incurred even when not accessing the data stored in the data storage circuitry, and retention time for which data can be retained. Even within the same data storage technology, it is possible to adjust the physical design parameters of the data storage circuitry to vary these performance parameters.

SUMMARY

At least some examples provide an apparatus comprising:
data storage circuitry comprising a plurality of entries to store data according to a data storage technology supporting non-destructive reads of data storable in the plurality of entries, each entry associated with an error checking code and an age indication;
access control circuitry to control access to the data storage circuitry; and
scrubbing circuitry to perform a patrol scrubbing cycle to visit each entry of the data storage circuitry within a scrubbing period, where on a given visit to a given entry, the scrubbing circuitry is configured to perform a scrubbing operation comprising:
  determining, based on the age indication associated with the given entry, whether a check-not-required period has elapsed for the given entry;
  in response to determining that the check-not-required period has elapsed for the given entry, performing an error check on the data of the given entry using the error checking code associated with the given entry; and
  in response to determining that the check-not-required period has not yet elapsed for the given entry, omitting the error check for the given visit to the given entry; wherein:
in response to a request causing an update to the data and the error checking code of a write target entry of the data storage circuitry, the access control circuitry is configured to update the age indication associated with the write target entry to restart the check-not-required period for the write target entry; and
in response to a request causing the data of a read target entry to be read non-destructively and subject to the error check, at least when the data of the read target entry is determined to be error-free based on the error checking code of the read target entry, the access control circuitry is configured to update the age indication associated with the read target entry to restart the check-not-required period for the read target entry.

At least some examples provide a non-transitory storage medium storing computer-readable code for fabrication of an apparatus comprising:
data storage circuitry comprising a plurality of entries to store data according to a data storage technology supporting non-destructive reads of data storable in the plurality of entries, each entry associated with an error checking code and an age indication;
access control circuitry to control access to the data storage circuitry; and
scrubbing circuitry to perform a patrol scrubbing cycle to visit each entry of the data storage circuitry within a scrubbing period, where on a given visit to a given entry, the scrubbing circuitry is configured to perform a scrubbing operation comprising:
  determining, based on the age indication associated with the given entry, whether a check-not-required period has elapsed;
  in response to determining that the check-not-required period has elapsed for the given entry, performing an error check on the data of the given entry using the error checking code associated with the given entry; and
  in response to determining that the check-not-required period has not yet elapsed for the given entry, omitting the error check for the given visit to the given entry; wherein:
in response to a request causing an update to the data and the error checking code of a write target entry of the data storage circuitry, the access control circuitry is configured to update the age indication associated with the write target entry to restart the check-not-required period for the write target entry; and
in response to a request causing the data of a read target entry to be read non-destructively and subject to the error check, at least read when the data of the read target entry is determined to be error-free based on the error checking code of the read target entry, the access control circuitry is configured to update the age indication associated with the read target entry to restart the check-not-required period for the read target entry.

At least some examples provide a method comprising:
storing data in a plurality of entries of data storage circuitry according to a data storage technology supporting non-destructive reads of data storable in the plurality of entries, each entry associated with an error checking code and an age indication;
performing a patrol scrubbing cycle to visit each entry of the data storage circuitry within a scrubbing period, where on a given visit to a given entry, a scrubbing operation is performed comprising:
  determining, based on the age indication associated with the given entry, whether a check-not-required period has elapsed;
  in response to determining that the check-not-required period has elapsed for the given entry, performing an error check on the data of the given entry using the error checking code associated with the given entry; and in response to determining that the check-not-required period has not yet elapsed for the given entry, omitting the error check for the given visit to the given entry;

in response to a request causing an update to the data and the error checking code of a write target entry of the data storage circuitry, updating the age indication associated with the write target entry to restart the check-not-required period for the write target entry; and in response to a request causing the data of a read target entry to be read non-destructively and subject to the error check, at least when the data of the read target entry is determined to be error-free based on the error checking code of the read target entry, updating the age indication associated with the read target entry to restart the check-not-required period for the read target entry.

Further aspects, features and advantages of the present technique will be apparent from the following description of examples, which is to be read in conjunction with the accompanying drawings.

DESCRIPTION OF EXAMPLES

Figure 1:
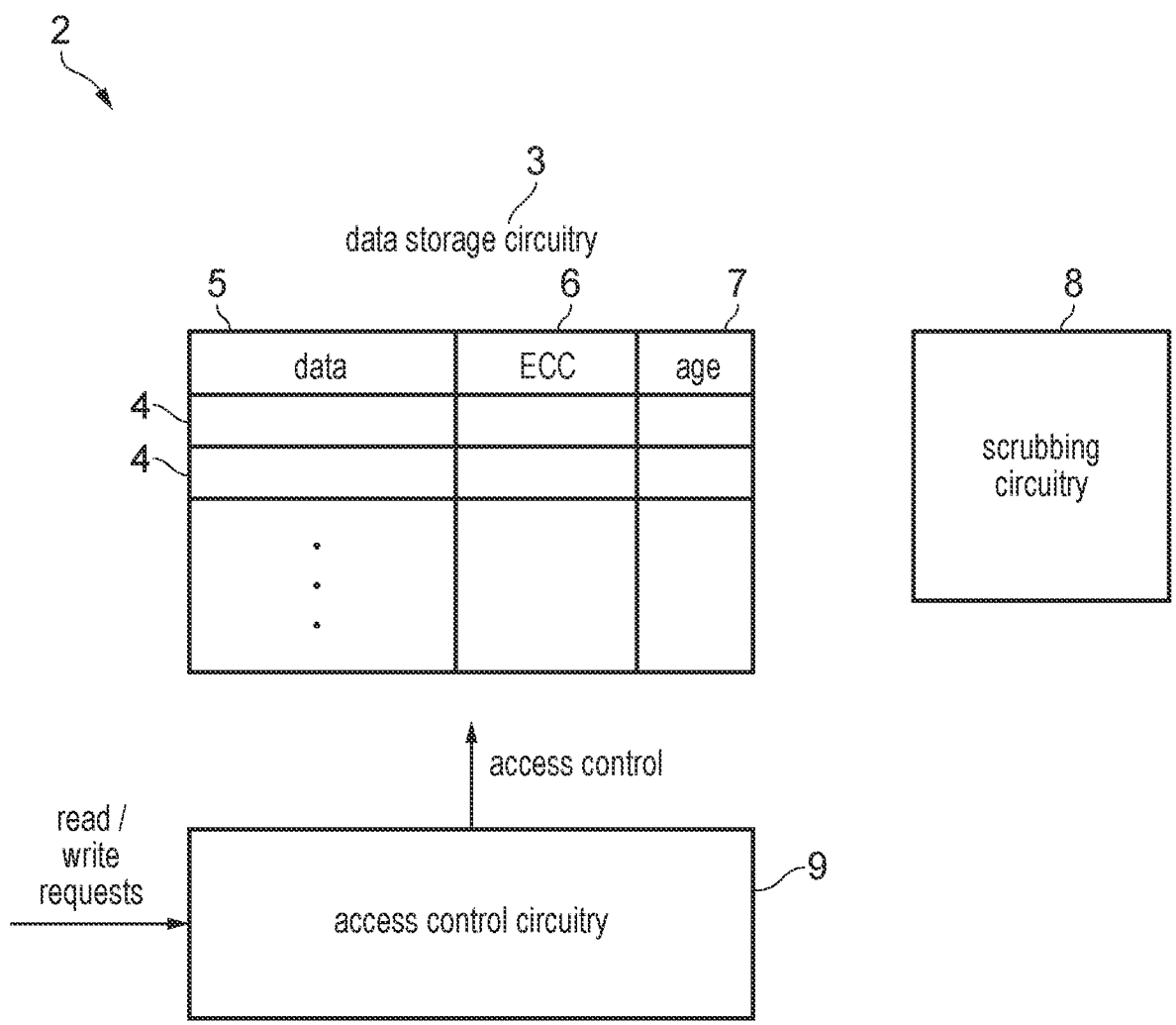
FIG. 1 illustrates an example of an apparatus having data storage circuitry, access control circuitry and scrubbing circuitry.

An apparatus has data storage circuitry comprising two or more entries to store data. The term "data" is used in a generic sense to refer to any stored information, so the "data" could include functional data (e.g. operands for instructions, or results of previously executed instructions), instructions, and/or control information such as tag information or coherency state information associated with a cache entry, for example. Access control circuitry is provided to control access to the data storage circuitry, for example response to read and write requests.

For some instances of data storage circuitry, the data storage technology used for the data storage circuitry and the physical design parameters for the specific instance of that data storage technology may be such that the retention time may be limited so that there is a risk of data stored in a given entry of the data storage circuitry being lost within the timeframe within which that data may need to be read on demand. Although the limited retention time may seem like a disadvantage, in practice the design parameters of the data storage circuitry may be selected to trade off a number of different properties, and for some use cases an implementation which provides a lower retention time may be preferred over implementations with longer retention time, e.g. because it could provide other advantages, such as reduced active energy cost when reading/writing, and/or reduced read or write latency.

Scrubbing circuitry can be provided to perform a patrol scrubbing cycle to visit each entry of the data storage circuitry within a scrubbing period. On a visit to a given entry, a scrubbing operation is performed. The scrubbing operation can include an error check on the data of the given entry, based on an error checking code associated with that entry. By providing the scrubbing circuitry which supports a periodic error check on the entry using an error checking code, this allows data storage designs with lower retention times to be tolerated.

However, performing the error check during the scrubbing operation incurs an energy cost, due to the power consumed in reading the data and the error checking code from the given entry and processing the data and the error checking code to determine whether the data is erroneous. To reduce the error cost of the patrol scrubbing cycle, the scrubbing operation includes a check of an age indication associated with the given entry, to determine whether a check-not-required period has elapsed. If the age indication indicates that the check-not-required period has elapsed for the given entry, the scrubbing operation includes performing the error check on the data of the given entry using the error checking code associated with the given entry. However, if the age indication for the given entry indicates that the check-not-required period has not yet elapsed for the given entry, the error check can be omitted in the current visit to the given entry.

In response to a request causing an update to the data and the error checking code of a write target entry of the data storage circuitry, the access control circuitry updates the age indication associated with the write target entry to restart the check-not-required period for the write target entry. The request causing the update to the data and the error checking code could, for example, be a write request from a request source (e.g. a CPU or other processing element) requesting a write to the given entry of the data storage circuitry, but could also be other forms of request which can cause updates to data in the data storage circuitry, such as a cache linefill operation which updates the entry with data read from memory following an earlier cache miss, or a snoop response message which causes an update to coherency state information stored in the given entry. As the update made in response to such a request causes the data and error checking code of the write target entry to be refreshed to an initial state known to be correct, the probability of the data and the error checking code becoming corrupted by loss of retention in a subsequent period can be relatively low and so by restarting the check-not-required period following the update to the data and the error checking code, the power cost of performing an error check on that entry can be avoided if the next visit to that entry in the patrol scrubbing cycle occurs within the check-not-required period.

One might assume that the age indication for a particular entry of the data storage circuitry should be updated to restart the check-not-required period only in response to write requests or other requests which actually update the data and error checking code of that entry. In a data storage circuitry implementing a data storage technology where reads of data stored in the data storage circuitry can be performed non-destructively (without modifying the state of the read entry), so that there is no need for the read data to be refreshed following the read, one would assume that as the read leaves the state of the data unchanged and does not refresh the contents of the read entry, and the probability of an error having occurred at any time since the most recent update due to a loss of retention increases with increasing time since the most recent update of the data of the entry, the check-not-required period should not be restarted on a non-destructive read.

However, counter-intuitively, the inventors have recognised that restarting the check-not-required period for a particular entry in response to a read of that entry can be beneficial, at least if an error check performed on that read has found that there is no error in the stored data. This is because there are data storage technologies for which the retention failure mechanism is such that the retention failure is based on a randomly occurring event such as thermal noise, so the probability of an error occurring at a given moment in time can be substantially independent of the length of time between the most recent update of the data and that given moment in time. While the probability of an error having occurred at any time in a period since the most recent write will nevertheless increase with the duration of that period (due to there being a greater number of moments in time at which the random error could occur during that period), if on a read of a read target entry it has been determined (based on the error checking code) that there is no error in the read data, the probability of any error occurring in the period between the most recent update of the data and the time when the read/error check is performed has been found to be zero. Hence, the period between the most recent update of the data and the current moment in time is not relevant for determining the probability of any error occurring, and so the period relevant for assessing the probability of future errors restarts on the read/error check. The probability of the error occurring in a future period of a given duration after the read/error check can be substantially similar to the probability of retention failure in a period of time of that same given duration immediately following a previous update of the data in the entry. Therefore, it can be appropriate to restart the check-not-required period for a read of a read target entry, similar to the restart of the check-not-required period for a write or other update to the data of a write target entry.

Hence, in response to a request causing the data of a read target entry to be read non-destructively and subject to the error check, at least when the data of the read target entry is determined to be error-free based on the error checking code of the read target entry, the access control circuitry is configured to update the age indication associated with the read target entry to restart the check-not-required period for the read target entry. By supporting restarting the check-not-required period for read target entries, not just write target entries, this increases the probability that on a given visit to a given entry during the patrol scrubbing cycle, the check-not-required period has not yet elapsed for the given entry, so that average power consumption over a scrubbing cycle can be reduced because it is more likely that a greater number of scrubbing error checks can be omitted.

This technique can be particularly useful where the data storage circuitry is a cache. For example, the cache could be a level 1 cache, level 2 cache, or further cache in a data processing system. In one particular example, the cache can be a last level cache (e.g. a system cache shared between multiple requesting devices), which is the final level of cache before the backing store provided by main random access memory. The technique of resetting the check-not-required period for a cache entry on both reads and writes to the entry can be particularly useful for a cache, because with a cache it may be expected that the replacement policy implemented by the cache may be likely to distribute read/write accesses across the entries of the cache (since infrequently accessed entries are preferentially replaced in comparison to more frequency accessed entries), and so, in comparison to main random access memory which acts as a backing store (for which some entries may be extremely infrequently accessed), it is much less likely that any given entry of a cache will not encounter any demand request causing either an update the data of the entry or a read of the data of the entry within a given period. Therefore, the fraction of entries which can have the error check omitted during the patrol scrubbing cycle can be much greater for a cache than for random access memory acting as a backing store. Hence, greater power savings are available for a cache than for backing store memory, and so the technique can be particularly useful for caches.

More particularly, the technique can be especially useful where the cache is a last level cache, which is the final level of cache before the backing store provided by main memory. For example, if there is a cache miss in the last level cache, a line fill request to allocate data to the cache would be serviced based on obtaining data from the backing store memory, without any possibility of the linefill being serviced by an intervening cache. Data storage technologies which enable non-destructive reads but may suffer from limited retention time may be more likely to be used for the last level cache than for caches closer to the CPU or other processing element, such as a level 1 or level 2 cache, because these data storage technologies may often have access latencies which are too slow for use as a level 1 cache, say. For the last level cache, slower access latencies may be tolerable and so it may be useful to use a data storage technology which enables lower energy cost of access or lower leakage power, at the expense of limited retention time. For such storage technologies, the scrubbing circuitry described above which skips performing error check if the age indication indicates that the check-not-required period has elapsed, and the access control circuitry which updates the age indication to restart the check-not-required for read and write target entries as described above, can be particularly useful to reduce the energy cost of performing the scrubbing while tolerating reduced retention time.

The data storage circuitry may comprise a first set of storage circuit locations to store at least the data and the error checking code of each entry according to a first data storage technology for which loss of stored data due to a retention failure is a stochastic (random) process. For example, loss of retention of stored state in a storage cell according to the first data storage technology may be a randomly occurring event which depends on a random physical phenomenon such as thermal noise, for example. The probability of a given entry of the data storage circuitry losing its state in a period starting from the write time when the entry is written to a given future time after that write time will increase with increasing duration between the write time and the given future time. However, it has been recognised that, for a data storage technology with a stochastic retention failure mechanism, although the total probability of loss of retention of stored state at any time during a time window increases with increasing duration of that time window, the probability of loss of retention of stored state in a given entry during a time window of fixed length (e.g. 1 ns) may be substantially equal regardless of the length of time between the most recent write to that entry and the start of the time window a fixed length, due to the stochastic nature of the failure event. This differs from storage technologies with leakage-based retention failure mechanism, such as dynamic random access memory (DRAM), where the retention failure is deterministic in that charge continually leaks from storage cell over time so that the probability of failure in a time period of fixed length is greater when that period of fixed length occurs a greater period of time after the most recent write than when that period of fixed length occurs a shorter period of time after the most recent write, and so it would not be appropriate to restart the check-not-required period in response to a read request. Hence, for storage technologies with a stochastic retention failure mechanism, it can be useful to restart the check-not-required period for read target entries, not just write target entries, to enable greater power savings in the scrubbing cycle as mentioned above.

In one particular example, the first data storage technology comprises MRAM (magnetoresistive random access memory) storage technology, which is a form of data storage technology which uses the effect of magnetoresistance (the dependence of resistance of a storage cell on the relative orientation of magnetization of layers of ferromagnetic material) to detect stored binary state. For example, whether or not the magnetization of two layers of ferromagnetic material are parallel or anti-parallel can be used to represent binary states of 0 and 1 respectively (or vice versa). The MRAM cell may have a higher resistance in the anti-parallel state than in the parallel state, which can be detected to read the state of the cell. More particularly, the first data storage technology may be Spin Transfer Torque magnetoresistive random access memory (STT-MRAM) which is a form of MRAM which uses a spin-polarized current to program the state of the MRAM. MRAM, and STT-MRAM in particular, are increasingly attractive for use as a last level cache in a data processing system (e.g. replacing static random access memory (SRAM) which might otherwise be used for cache), because of its lower leakage power and higher density (reduced circuit area for a given amount of stored data), but this is at the expense of a longer write latency and higher dynamic write energy. The dynamic write energy cost can be reduced by choosing physical design parameters for the MRAM instance that trade off write energy cost against retention time (e.g. reducing the size of the energy barrier which would have to be overcome for a switch of state between the parallel/anti-parallel magnetization states may reduce dynamic write energy cost but also reduce retention time). Hence, to support a lower dynamic write energy cost, it could be desirable to design the system so that the lower retention of the MRAM storage can be tolerated, by providing the scrubbing circuitry described above. However, the scrubbing error checks themselves incur an energy cost, which may be significant if only writes could restart the check-not-required period, not reads. Therefore, the technique discussed above which also allows the check-not-required period for an entry to be restarted on reads can be particularly useful when the data storage circuitry is based on MRAM storage technology.

In some examples, the storage circuit locations used to store the age indication of the given entry may be designed according to the same storage cell design as the storage circuit locations used to store the data or error checking code of the given entry. For example, the cells used to store the data, error checking code and age indication could all use the same data storage technology and, within the limits of manufacturing tolerance, the same physical cell design parameters (e.g. same dimensions and materials for components of the cell).

However, as the age indication may need to be read on each visit to a given entry during the patrol scrubbing cycle (to determine whether the check-not-required period has elapsed), while the data and error checking code do not need to be read for visits where the check-not-required period has not yet elapsed, it can be beneficial to store the age indication in a second set storage circuit locations which, compared to the first set of storage circuit location storing at least the data and the error checking code, have reduced access latency and/or reduced read access energy cost. This can help to improve the performance and/or energy efficiency of performing the patrol scrubbing cycle.

The reduced access latency and/or reduced read access energy cost of the second set of storage circuit locations could be provided in different ways.

In one example, the first set of storage circuit locations and the second set of storage circuit locations use a same data storage technology but have different physical design parameters. The different design parameter may provide different performance parameters for the first/second set of storage circuit locations, such as differences in retention time, access latency and/or read/write access energy cost. For example, the first and second sets of storage circuit locations can both use MRAM data storage technology, but the physical parameters of the storage cells (e.g. dimensions of layers of the MRAM storage cells, materials used, etc.) may be different for the first set of storage circuit locations used for the data and error checking code compared to the second set of storage circuit locations used for the age indication. For example, an MRAM variant which has a longer retention time could be used for the age indication (in comparison to the MRAM variant with a shorter retention time used for the data and error correcting code), which can help reduce the chance of errors in the age indication due to loss of retention and/or reduce the write energy cost of updating the age indication in response to each update/read request.

In another example, the second set of storage circuit locations may use a second data storage technology different to a first data storage technology used for the first set of storage circuit locations.

For example, the first data storage technology could be MRAM but the second data storage technology could be SRAM (static random access memory). Implementing the storage circuit locations used for the age indication in SRAM may help to reduce the access time and read access energy for checking the age indications (which may be done on each visit to an entry during the patrol scrubbing cycle), but as the age indication may have relatively few bits in comparison to the data and error correcting code, this may not significantly detract from the leakage and density advantage of implementing the storage circuit locations for storing the data and error correcting code in MRAM rather than SRAM. Hence, a combination of MRAM for the data and error correcting code and SRAM for the age indication could provide a better balance between performance, read energy cost, leakage power and storage density.

The error checking code could be implemented in different ways. In some examples, the error checking code could be an error detecting code (EDC) which supports detection of errors in stored data, but does not support the ability to correct the error to restore the original value of the erroneous data based on the error detecting code. Alternatively, the error checking code could be an error correcting code (ECC) which supports not only the detection of errors in stored data, but also the determination of the correct error-free value from the combination of the stored data and the error correcting code. The error check code can be generated using any error detection or correction scheme including, for example, hash functions such as cyclic redundancy checks or cryptographic hash functions, checksums, or any other form of error checking procedure, ECCs (error-correcting codes), DED (double error detecting codes) and SECDED (single-error-correcting, double-error-detecting) codes.

In some examples, in response to the request causing the data of a read target entry to be read non-destructively, the updating of the age indication to restart the check-not-required period may be conditional on the data of the read target entry being determined to be error-free based on the error checking code of the read target entry. In this case, if the data of the read target entry is determined to be erroneous based on the error checking code, the age indication of the read target entry would not be reset to restart the check-not-required period. This may reflect that the assumption, that for a storage cell with a stochastic retention failure mechanism the probability of error in the forthcoming period of duration equal to the check-not-required period is similar to the probability of error in the initial check-not-required period following a previous write, would not be valid if the error checking code has been used to detect that an error has already occurred.

However, in other examples, the age indication could be updated to restart the check-not-required period in response to the request causing the data of the read target entry to be read non-destructively, even if the error check based on the error checking code finds that the data of the read target entry is erroneous. This may still be acceptable, depending on the particular response taken when the error check identifies that the data is erroneous. For example, if the error handling response causes the error to be corrected and the erroneous data to be overwritten with correct state, or the error handling response causes the entry with the erroneous data to be flagged as erroneous so that it will not in any case be used for any subsequent operation, then it may still be acceptable to update the age indication to restart the check-not-required period even if the data is not determined to be error-free. Implementation of the control logic for updating the age indication to restart the check-not-required period may be simpler and/or offer better timing performance if the update of the age indication in response to the request causing the data to be read does not have to be conditional on the outcome of the error check being that the data is error-free.

Therefore, although the age indication being updated to restart the check-not-required period may occur at least when the data of the read target entry is determined to be error-free, it is not essential that this update is prevented from being performed if the data of the read target entry is determined to be erroneous in the error check performed in response to the read request.

The age indication could represent whether or not the check-not-required period is still pending in different ways. In one example, when the check not required period needs to be restarted, the age indication could be reset to an initial value (such as zero). A periodic update may be made to increment the age indications of each entry of the data storage. The determination of whether the check-not-required period has elapsed may be based on whether the age indication of the given entry has exceeded a threshold.

However, a more efficient approach can be that a timer is used to provide a current time indication, and when restarting the check-not-required period for an entry of the data storage circuitry, the access control circuitry updates the age indication of that entry to specify the current time indication provided by the timer. In this case, determination of whether the check-not-required period has elapsed for the given entry may be based on a comparison of the age indication for the given entry and the current time indication provided by the timer. This approach allows the age indication initially written to a given entry when restarting the check-not-required period to remain unchanged thereafter (at least until another occasion when the check-not-required period needs to be restarted). By allowing the given entry's age indication to remain static and using a separate timer value to track the elapse of time, fewer writes to the age indications are needed, saving energy.

In some examples, the current time indication is a coarse time indication comprising at least one bit indicative of a current epoch of time. It would be sufficient for single bit to be used to mark the current epoch of time, allowing epochs alternating between epoch 0 and epoch 1 to be distinguished. However, supporting four or more epochs using a coarse time indication with two or more bits can allow greater energy savings by enabling a greater fraction of entries of the cache to have their error check omitted on a visit in the patrol scrubbing cycle. The coarse time indication does not need to be particularly precise, and as few as one or two bits in the epoch indication can be sufficient.

With the epoch-based approach tracked by a relatively coarse time indication, the scrubbing circuitry may determine that the check-not-required period has elapsed for the given entry when the current epoch of time indicated by the current time indication is more than a predetermined number of epochs ahead of an epoch indicated by the age indication for the given entry. For example, the predetermined number could be one or two epochs. In this case, the duration of the check-not-required period may correspond to the predetermined number of epochs. In some examples, whether the current epoch of time is more than the predetermined number of epochs ahead of the epoch indicated by the age indication could be determined based on a truth table which indicates, for the epoch number indicated by the current time indication and the epoch number indicated in the age indication a given entry, whether for that pair of epoch numbers, the error check would need to be performed in the scrubbing operation. In other examples, whether the current epoch of time is more than the predetermined number of epochs ahead of the epoch indicated by the age indication can be determined by subtracting one of the current epoch indication and the age indication from the other, using modulo arithmetic.

The timer may update the current epoch of time indicated by the current time indication at a given update frequency whereby a period between two successive instances of the timer setting the current time indication to a given epoch value is an epoch cycle period with a duration greater than or equal to twice the scrubbing period. Hence, by ensuring the epoch cycle period is at least twice the scrubbing period, this means that during a given scrubbing period, the current epoch cycles through half the available epoch values or less, to ensure that within a given scrubbing period there is no confusion between entries assigned to earlier and later epochs of time which have been allocated the same epoch value. In practice, it may be most efficient for the epoch cycle period to be exactly twice the scrubbing period (this will tend to reduce the number of unique epoch values required, and hence the number of bits in the age indications stored for each entry).

It can be useful to set the scrubbing period (and hence the epoch cycle period) dependent on the retention time of the storage circuit units of the data storage circuitry. However, the retention time may vary depending on operating conditions of the data storage circuitry, such as temperature or external magnetic field strength. In some cases, the epoch cycle period and scrubbing period may be fixed, regardless of such operating conditions, for example based on a worst case assumption of the retention time under worst case operating conditions.

However, in other examples, the timer may update the current epoch of time indicated by the current time indication with a given update frequency which is variable depending on at least one operating condition of the data storage circuitry. Similarly, the scrubbing period duration may depend on at least one operating condition of the data storage circuitry. For example, the at least one operating condition may be temperature and/or external magnetic field strength. By allowing adaptation of the scrubbing period and epoch cycle period based on monitoring of external operating conditions, then this can help to improve energy efficiency because it is not necessary to perform the scrubbing operation as frequently if the current operating conditions are such that the worst case retention conditions are not occurring.

The scrubbing operation performed for a given entry of the data storage circuitry during the patrol scrubbing cycle could also include other operations, not related to the error check providing tolerance for the limited retention time of the data storage circuitry.

For example, the scrubbing operation may also comprise performing, when at least one cache cleaning condition is satisfied, a cleaning operation to write back data of the given entry to a backing store. In an implementation where the data storage circuitry is used as a cache, if the given entry is being visited by the scrubbing circuitry already, it can be a good opportunity to clean dirty data from that entry and write back the dirty data to memory, reducing the writeback bandwidth that would need to be consumed later if the entry is subsequently evicted.

Various conditions could be used to determine whether, during the scrubbing operation, the cleaning operation should actually be performed on a given visit to the given entry during the patrol scrubbing cycle. For example, the at least one cache cleaning condition may comprises at least one of:
- a dirty condition dependent on whether the data of the given entry is dirty. If the data is not dirty, there is no need to clean the entry.
- an age indication condition dependent on whether the age indication associated with the given entry indicates that the check-not-required period has elapsed for the given entry. If the age indication indicates that the check-not-required period has not yet elapsed and so the error check is not being performed, cleaning the entry would incur an additional read of the data of the given entry, reducing the energy saving from skipping the error check. Therefore, some implementations might support performing the cleaning operation in a case where the check-not-required period has elapsed (because the data and error checking code are already being read to perform the error check), but omit the cleaning operation when the check-not-required period has not yet elapsed to avoid needing to read the data of the entry in that case.
- an error check condition dependent on whether the data of the given entry is determined to be error-free based on the error checking code (it may be preferable not to write back erroneous data to a further cache or backing store memory).
- a bandwidth condition dependent on current utilisation of bandwidth on a data path between the data storage circuitry and the backing store (the cleaning operation can be performed when current utilisation of bandwidth is lower than a threshold, but omitted when current utilisation of bandwidth is higher than a threshold); and
- a usage prediction condition dependent on a prediction of whether the data of the given entry is likely to be required for servicing a future request (the cleaning operation may be preferentially performed for entries considered unlikely to be required for servicing a future request, in comparison to entries that are more likely to be written to again making the current data that could be written back out of date).

Any of these conditions could be combined.

Another operation which can be combined with the error check in the scrubbing operation is deadblock prediction (prediction of whether a given cache entry is likely to be accessed again within a subsequent period). For example, the scrubbing operation may comprise evicting the given entry (e.g. invalidating the given entry, and, if the data is dirty, also writing back the dirty data to a further cache or memory). Alternatively, the eviction may not happen directly in response to the scrubbing operation, but the scrubbing operation may comprise marking the given entry as preferred for eviction in response to a prediction that the given entry is predicted to be a dead entry (in this case, a subsequent replacement decision might be more likely to choose the given entry as the victim entry to be replaced with new data for a different address).

For example, the prediction of dead entries could be based on the age indication associated with the entry. If the age indication indicates an epoch which is more than a predetermined number of epochs behind the current epoch, this can indicate that there has been no read or write to the entry for some time, making the entry a better candidate for eviction than other entries accessed more recently. By performing the deadblock prediction (and possibly the eviction operation, depending on the deadblock prediction) for a given entry at the time of the visit to the given entry already being performed for error checking reasons, this can reduce energy cost compared to an approach where the deadlock prediction and/or invalidation operations were performed at a different time to the error check.

FIG. 1 schematically illustrates an example of an apparatus 2 having data storage circuitry 3. The data storage circuitry 3 has a number of entries 4 for storing data. Each entry 4 stores the data 5 itself (e.g. functional data, instructions, address tags for cache entries, coherency state information for cache entries, etc.), as well as an error check code 6 for checking whether the data has encountered an error (e.g. due to loss of retention due to the limited retention time of the storage technology used to store the data 5), and an age indication 7 indicative of a period elapsed since the data 5 in the entry 4 was read or written. Scrubbing circuitry 8 is provided to perform a periodic patrol scrubbing cycle, where in each scrubbing period the scrubbing circuitry 8 visits each entry 4 of the data storage circuitry 3 to perform a scrubbing operation which includes at least a check based on the error check code 6 for determining whether the data 5 is erroneous. Access control circuitry 9 controls access to the data storage circuitry 3 in response to read and write requests (as well as other types of request which may result in data 5 of a given entry 4 being read or updated, such as cache linefill requests, snoop request or snoop responses, etc.). In response to both requests that result in data 5 of a given entry being read, and requests that result in the data 5 of a given entry being updated (with the error correcting code 6 also being updated to match the updated data 5), the age indication 7 of the given entry is updated to restart a check-not-required period during which it is unnecessary to perform the error check of the scrubbing operation if that entry is visited by the scrubbing circuitry 8 before the check-not-required period has elapsed. Hence, during the scrubbing operation, the scrubbing circuitry 8 checks the age indication 7 of the current entry 4 being visited at the current point of the scrubbing cycle, and if the age indication indicates that the check-not-required period is still pending (not yet elapsed) for the current entry being scrubbed, then the error check can be omitted. The error check is performed if the check-not-required period has already elapsed for the current entry. This means that, for entries for which the check-not-required period has not yet elapsed, only the age indication 7 can be read, reducing the energy cost by omitting reads to the data 5 and error correcting code 6 fields of the entry.

This approach can be particularly useful where the data storage circuitry is used as a cache memory, because for a cache the replacement policy used by the cache may tend to cause infrequently accessed entries to be evicted and replaced with more recently updated data, and so this distributes the frequency of read/write accesses more uniformly across the cache storage than would be the case for data storage circuitry acting as a main memory (backing store, not a cache). Hence, for a cache there may be a higher probability of a given entry having been accessed by a read or write sufficiently recently that the age indication 7 indicates that the check-not-required period is still pending.

It will be appreciated that FIG. 1 illustrates, for ease of understanding, a table structure where each entry comprises information 5, 6, 7, it is not essential for all of this information to be provided in a single combined storage unit. For example, in some examples, the age indication 7 could be stored in a separate storage unit from the data 5 and ECC 6 (in some cases, with the storage technology for the storage unit storing the age indication 7 implemented using a different memory storage technology from the storage technology used for storing the data 5 and ECC 6).

Figure 2:
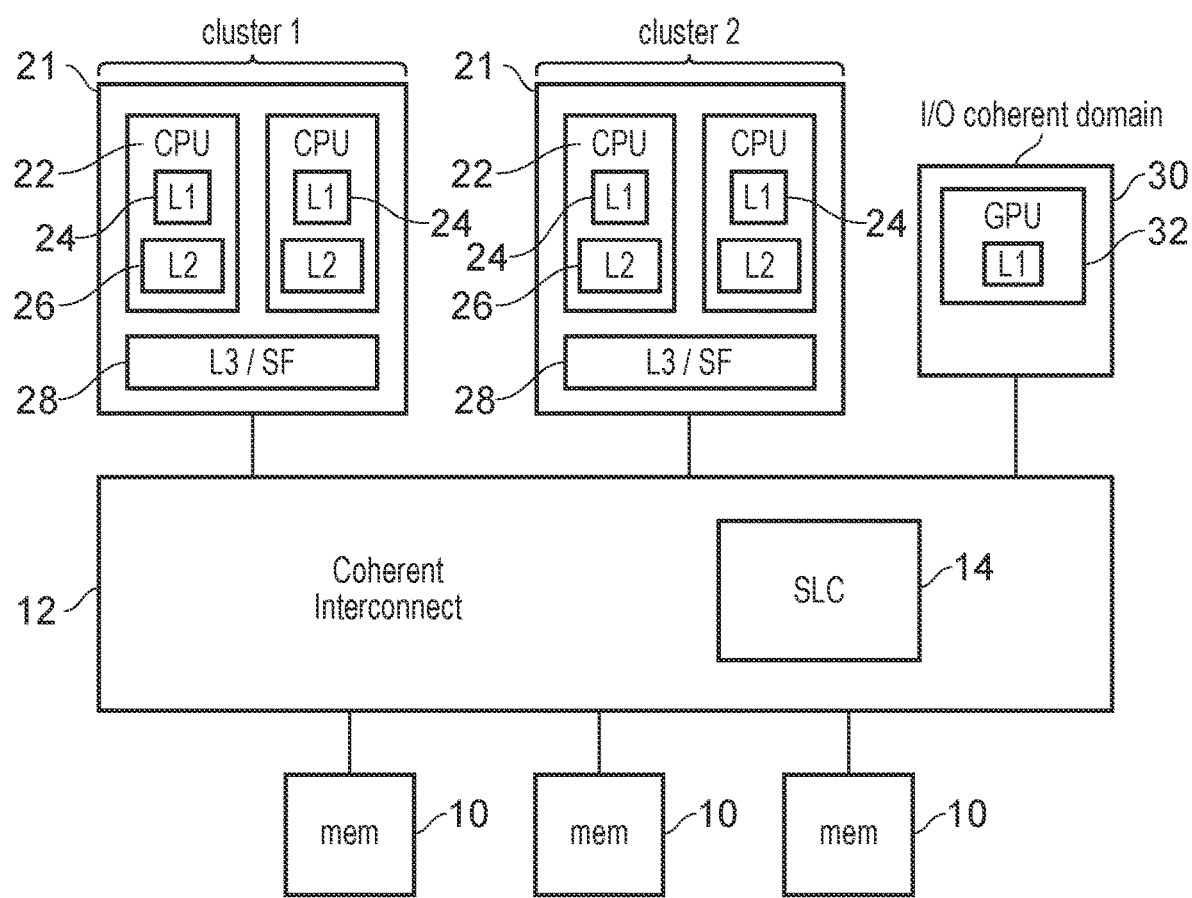
FIG. 2 illustrates an example of caches and memory devices within a data processing system.

FIG. 2 schematically illustrates an example of a data processing system having caches which could benefit from this approach. The system comprises a coherent interconnect 12, system level cache 14 (also known as a last level cache), and memory 10. The system also includes two processing clusters 21 and an I/O coherent domain 30. Each processing cluster 21 comprises one or more central processing units (CPUs) 22 (in the example shown, each processor includes two CPUs 22), private caches associated with each CPU (L1 cache 24, L2 cache 26), and a shared cache 28 shared between the CPUs of the cluster 21. The shared cache 28 can include a snoop filter to filter coherency transactions issued between CPUs 22 in the processing cluster 21. The I/O coherent domain (or one-way coherent domain) includes devices which may issue coherent access requests, but are not themselves snooped by the coherent interconnect 12. For example, the I/O coherent domain may include a graphics processing unit (GPU) 32. The GPU may have its own private cache, but this private cache is not snooped by the coherent interconnect 12 (e.g. the private cache may not need snooping if it is not possible for the GPU to write dirty data to the cache—e.g. this may be the case if the cache is a translation lookaside buffer caching address translation information from page tables stored in the memory system). The system level cache 14 acts as a last level cache before main memory 10. It will be appreciated that FIG. 2 merely shows one possible example of caches that can be implemented within a data processing system, and many other arrangements are possible. However, the techniques discussed below can be particularly useful for the system level cache 14 (last level cache), where a slower access latency can be better tolerated than for the L1/L2 caches 24 closer to the CPUs 22, making the last level cache more suitable for using MRAM storage technology as discussed below. Nevertheless, this is just one example, and in general the data storage circuitry 3 shown in FIG. 1 could be any cache or memory within a data processing system.

There is growing interest in using Spin Transfer Torque Magneto-Resistive Random Access Memory (STT-MRAM) to replace SRAM for last level cache (LLC). STT-MRAM is attractive because of its significantly lower leakage power and high density (compared to SRAM); STT-MRAM, however, has the disadvantages of long write latency and high dynamic write energy.

Retention is the ability of an NVM device to maintain and provide on-demand the programmed state of a memory cell for a minimum period. STT-MRAM has decreasing data retention at elevated temperatures because of the temperature-dependence of magnetic anisotropy. To increase data retention at elevated temperatures, magnetic anisotropy of the devices must be increased. This in turn leads to larger write currents at lower temperatures, thus reducing the efficiency of the memory and increasing its access time.

STT-MRAM retention failure is a stochastic process due to thermal noise, so an error check code (e.g. error detecting codes, or error correcting codes (SECDED or DECTED, for example)) and memory scrubbing can be used to maintain chip error rate (CER) within acceptable bounds, whilst enabling devices with lower magnetic anisotropy to be employed. When a location 4 of the data storage circuitry 3 is written, new error check code bits 6 are computed and stored with the data 5.

Memory scrubbing is the process of reading from each memory location, detecting (and if possible correcting) bit errors (if any) with the error check code, and if possible writing the corrected data and ECC back to the same location.

There is a trade-off between the retention time and other parameters of the STT-MRAM device. Relaxing the non-volatility time facilitates a lower write current or faster switching speed. For example, the physical design parameters of an MRAM storage device (such as physical dimensions and materials used for various components of the storage cells) can be chosen to target behaviour which favours either longer retention (at the expense of increased write energy cost) or increased energy efficiency (at the expense of shorter retention). The table below shows two example configurations of MRAM storage cells, and their properties (again, this is just one illustrative example and other designs are possible):

|  | NV-RAM | RAM-like |
|---|---|---|
| Density | 0.025 $\mu m^2/b$ | 0.018 $\mu m^2/b$ |
| Write latency | 50 ns | 20 ns |

-continued

|  | NV-RAM | RAM-like |
| --- | --- | --- |
| Read latency | 10 ns | 5-10 ns |
| Write energy | 10 pJ/b | 4 pJ/b |
| Read energy | 1 pJ/b | 1 pJ/b |
| Array Leakage | 0 | ~1 pA/b (from periodic data scrubbing) |
| Retention | 10 years | 1 second |

For an MRAM storage unit used as a cache, one would like to reduce the retention time such that it is just sufficient to hold cached data for the lifetime of that data (retention time longer than the expected lifetime of the data will not be beneficial and tend to increase energy cost of writing to the storage entry).

In a cache memory, most blocks are accessed frequently, but the lifetime of cached data follows a distribution and therefore some blocks may be much older than average. To prevent corruption of architectural state, the scrubbing circuitry 8 performs a patrol scrubbing cycle to guarantee to visit each storage entry 4 within a given scrubbing period (selected based on the retention time interval for the particular storage technology and physical design being used), where the scrubbing period is sufficiently short that errors caused by random thermal processes can be detected (and, ideally, corrected).

Cache lifetimes are of the order of microseconds to milliseconds, but if we were to reduce the retention time to, say, 1 ms, then, even with an improvement in throughput due to a reduction in latency, we would have to scrub a data bank of, say, 4 Mb in that time. The proportion of bandwidth used would be prohibitive. Accounting for the read part of the scrub only and assuming 10 ns access time and 128 b word, this would be 4 Mb/128 b*10 ns/1 ms=32% the available bandwidth of the memory!

With the approach described here, error checks are performed on-demand: when a location in the STT-MRAM is read, the ECC check bits are used to detect data corruption. If an error is detected, it is corrected if possible, and the corrected data is written to the memory location.

We observe that, because of on-demand scrubbing on reads, that whenever a block is accessed (whether corrected or not) it will be error-free. The retention time for such a block starts anew. In particular, we note that this is true for both read and write accesses, if we ensure that an ECC check is performed on reads. This is counter-intuitive as one might assume that the retention time for a block re-starts only when it has been written. However, while such an assumption would be valid for a refresh of data in a DRAM memory (where the retention failure mechanism is that a DRAM bit cell leaks charge deterministically over time, causing data stored to change and therefore requires a 'refresh' operation that periodically restores electrical charge to maintain data integrity), for MRAM it is unnecessary to write the data line if no error is detected, as STT-MRAM has non-destructive reads. Also, the retention failure mechanism for MRAM is a random (stochastic) process due to random thermal noise, so the probability of retention failure in a given period of time depends on the duration of that period of time but is substantially independent of the length of time between the most recent write to that entry and the start of the given period of time.

Hence, by restarting the check-not-required period following a request which merely non-destructively reads the data of a given entry, not only for requests which update the data, this increases the fraction of entries which can have their error checks skipped on a given visit in the patrol scrubbing cycle, reducing the power consumption incurred on average during the patrol scrubbing cycle.

Figure 3:
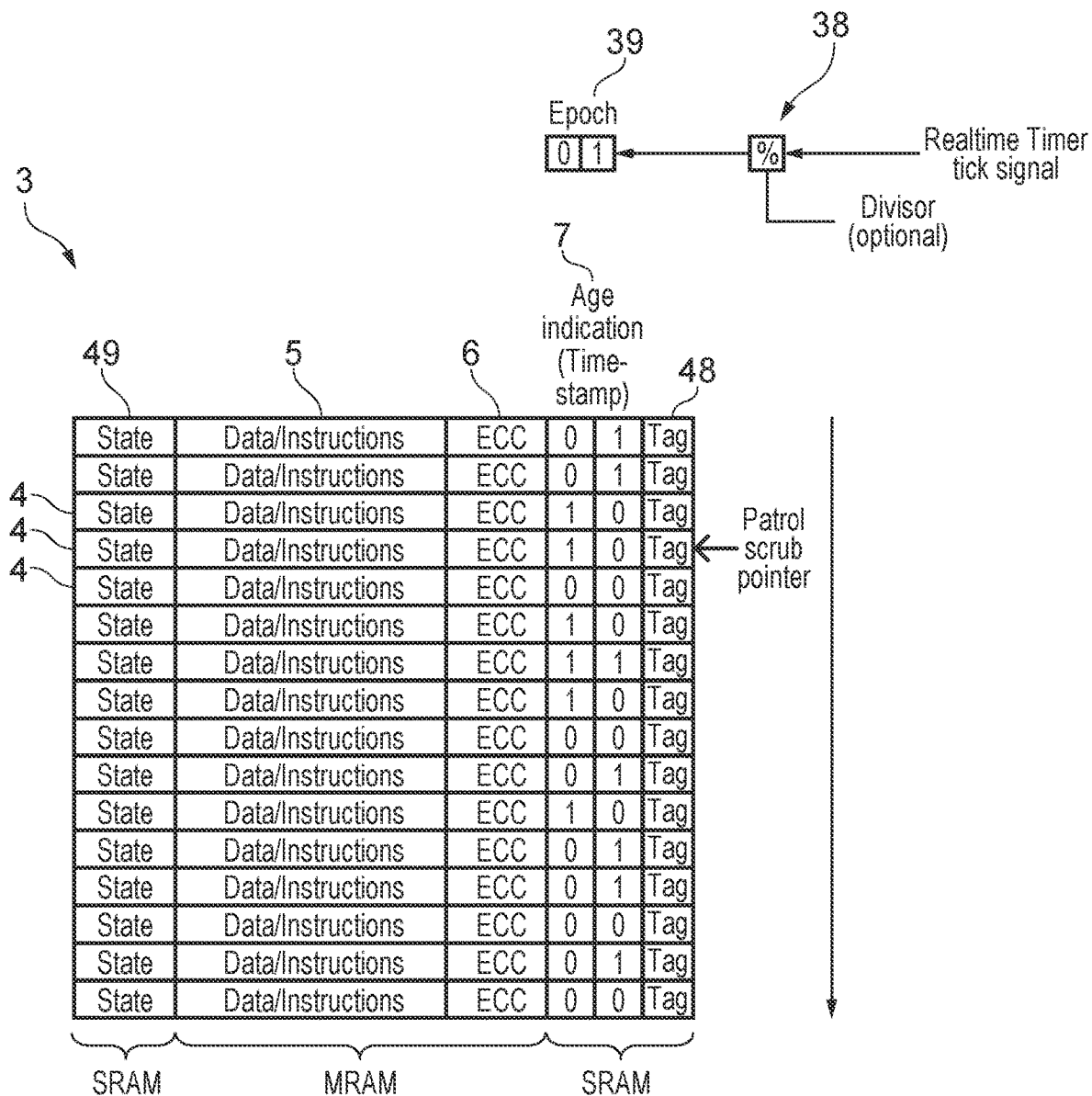
FIG. 3 illustrates an example of performing a patrol scrubbing cycle, where on a visit to a given entry in the patrol scrubbing cycle, a scrubbing operation comprises determining, based on an age indication associated with a given entry, whether to perform or omit an error check for that entry based on an error checking code.

A specific example is set out below with reference to FIGS. 3 to 5. In the example of FIG. 3, each entry 4 comprises data 5 (including functional data and/or instructions), the ECC 6, age indication 7, as well as a cache tag 48 and coherency state information 49. While all of this information is shown logically as a single combined entry 4 in FIG. 3, as explained below, a given entry 4 could be stored across a number of separate storage structures implemented using different storage technologies.

As shown in FIG. 3, we associate each entry 4 of the data storage circuitry 3 with a timestamp acting as the age indication 7. The age indication 7 for the entry 4 is updated each time the memory location is updated (e.g. for a write request), error-checked during an on-demand read operation, or scrubbed in a patrol scrub. The timestamp may be generated by a timer 38 as a coarsened time indication (age value) of one or a few bits, representing a current 'epoch'. Using more than one bit can increase the fraction of scrubs that are bypassed. An epoch counter 39 tracks the current epoch. The timestamp value and epoch value could use an encoding, for example a Gray-code, to simplify comparison logic.

The current value of the epoch is copied to the timestamp 7 associated with a scrubbed entry 4 whenever that location has been scrubbed, either on a demand read or a write access or by a 'patrol' scrub which periodically visits each location lines. Setting the age indication 7 to match the current epoch value provided by the timer 38 restarts the check-not-required period during which that entry does not need to be error-checked if the scrubbing circuitry 8 visits that entry during the patrol scrubbing cycle.

In some examples, the storage cells used for storing the age indication 7 may use SRAM memory, which is expected to have a lower access time and energy than the associated data that is stored in STT-MRAM. The age indication 7 could for example be stored together with the tag in a cache. Alternatively, the age indication could be stored in an MRAM variant that has higher retention (and hence lower write energy cost) compared to the MRAM variant used for the data 5 and ECC 6. The tag 48 and coherency state 49 could also be stored in SRAM.

Figures 4, 5:
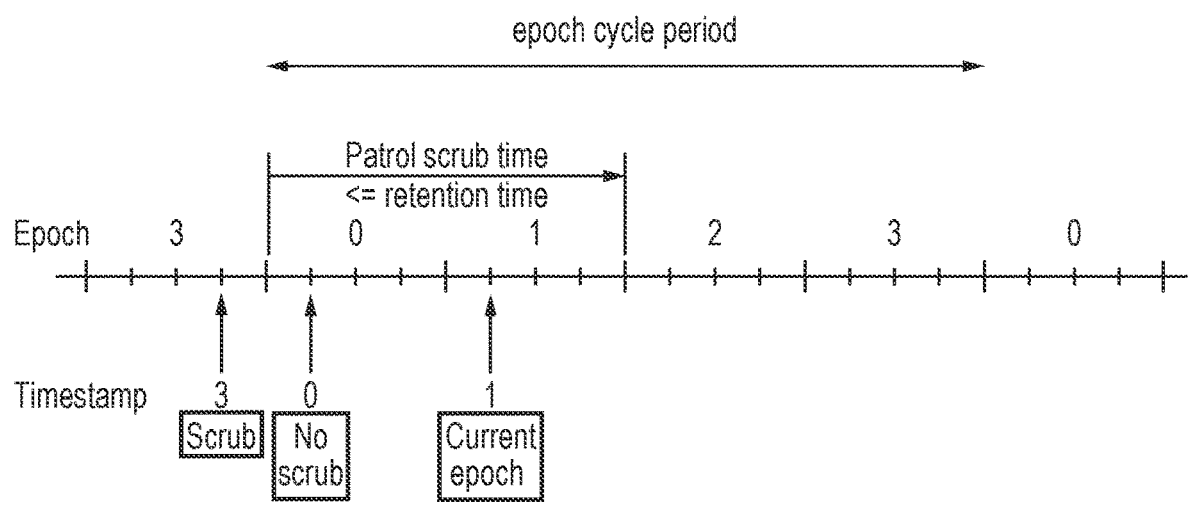
FIG. 4 illustrates an approach where the age indication is implemented as an epoch-based coarse time indication.
FIG. 5 illustrates an approach for determining, based on a current time indication and the age indication of a given entry, whether the error check should be performed on a current visit to the given entry during the patrol scrubbing cycle.

FIG. 4 illustrates the granularity of patrol scrub cycles in comparison to the frequency with which the epoch value is updated by the timer 38. A background 'patrol' scrub process visits every location at least once in every retention time. The time taken for the patrol scrub process to pass through the entire array is the scrubbing period or "patrol scrub time" shown in FIG. 4. During each scrubbing period, the epoch count is incremented by half of its maximum count in equal time steps (or if the epoch value is represented by only one bit, then it is updated only once per patrol scrub cycle). Hence, an epoch cycle period (the period between successive times when the epoch is set to a given value, e.g. 0) is twice the scrubbing period. In other examples, the epoch cycle period could be greater than twice the scrubbing period.

When the scrubbing circuitry 8 performs the scrubbing operation for a given entry 4, it checks the timestamp counter plus the valid state of the memory location. The age of the memory location is the current time indication provided by the epoch counter 39 of the timer 38 minus the age indication of the given entry 4 (in modulo arithmetic). If the location is valid and its age is such that the location will not be visited again before the retention time has passed, the location is scrubbed; otherwise, it is bypassed. This could be determined based on the difference between the current time indication and age indication indicating that more than a predetermined number of epochs have passed since the given entry 4 had its age indication reset.

The truth table shown in FIG. 5 shows an example of controlling whether the error check is needed in the scrubbing operation for a given entry. The "timestamp" refers to the epoch indicated by the age indication 7 for the given entry (which will match the value of the epoch counter 39 at the time when the most recent demand read or write was performed). The "current epoch" in FIG. 5 refers to the current value of the epoch counter 39 at the time when the scrubbing operation is being performed for the given entry. In this example, a binary encoding of the epoch value is used, but as mentioned above other encodings such as a Gray encoding could also be used. The combination of "timestamp" and "current epoch" values selects a truth table entry which, if 0, indicates that no scrubbing error check is needed, and if 1, indicates that the scrubbing error check should be performed for the current visit to the given entry. For example, if the current epoch is epoch 1 (0b01), an entry with timestamp indicating epoch 3 (0b11) will be error checked in the scrub, but an entry with timestamp indicating epoch 0 (0b00) will not be error checked (as indicated by the "scrub", "no scrub" indications in FIG. 4). It will be appreciated that the scrubbing circuitry may implement circuit logic which controls whether the error check is performed according to the rules shown in the truth table, but need not actually use such a truth table to determine whether the error check is needed (e.g. the comparison could instead be implemented by subtracting the age indication 7 from the current time indication provided by epoch counter 39 using modulo arithmetic, and comparing the resulting value with a threshold).

By bypassing locations that have already been scrubbed, the patrol scrub only need perform an access to the timestamp SRAM, which would have a higher available bandwidth and a lower access power, rather than the data STT-MRAM. This could significantly reduce the bandwidth and power overhead of the scrubbing process. By enabling lines that have been read to be bypassed, we shall achieve a greater reduction in patrol scrubbing overhead than that in the prior art.

The error check of the patrol scrub could be combined with other periodic operations which are performed entry-by-entry in a cyclic manner over a period of time. For example, we can choose to invalidate or clean locations if they are predicted to be dead blocks, and an additional counter of the number of patrol scrubs undergone could be associated with each memory location to help identify the dead blocks which are not being read/written frequently enough to justify keeping them in the cache. The patrol could also be combined with patrol for eager writeback, that is, especially during periods of low DDR activity, opportunistically cleaning cache blocks. The patrol can also be combined with cleaning or invalidating data from unused partitions. The epoch id further can be used to indicate stale data, in cooperation with software drivers. For these other purposes, it may be useful to make the periodicity of the patrol a defined multiple of the OS scheduling tick to enable the OS to predict when these operations are complete.

The epoch cycle period and scrubbing period can be a function of temperature (or any other relevant parameter or predetermined value, such as an external magnetic field strength) to allow adaptation of the patrol scrub to the retention time. Alternatively, the epoch cycle period and scrubbing period may independent of environmental operating conditions, and may be set based on worst case retention time.

Figure 6:
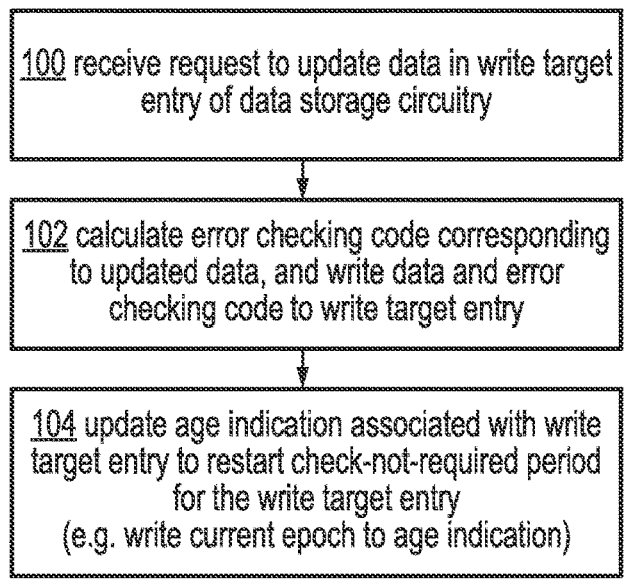
FIG. 6 illustrates a method of processing a request to update data in a write target entry of the data storage circuitry.

FIG. 6 is a flow diagram illustrating a method of processing a request which causes an update to data in a write target entry of the data storage circuitry 3. The write target entry is selected based on an address specified by the request. At step 100, the request is received by the access control circuitry 9. The request could be a write request issued by a requester (e.g. the CPU 22 or GPU 32) to update functional data stored in a given cache entry, or could be a cache linefill request to update the data 5 of a cache entry 4 based on data read from memory 10 or a subsequent cache. In some cases, where the data 5 includes coherency state information, the request could also be a snoop request or snoop response which causes a change to the coherency state associated with cached information. In response to the request, at step 102, the access control circuitry 9 calculates an error checking code corresponding to the updated data, and writes the updated data and the error checking code to the write target entry corresponding to an address specified by the request. At step 104, the access control circuitry 9 also updates the age indication 7 associated with the write target entry to restart the check-not-required period for the write target entry. For example, the current epoch value provided by the epoch counter 39 of the timer 38 may be written to the age indication 7 of the write target entry.

Figure 7:
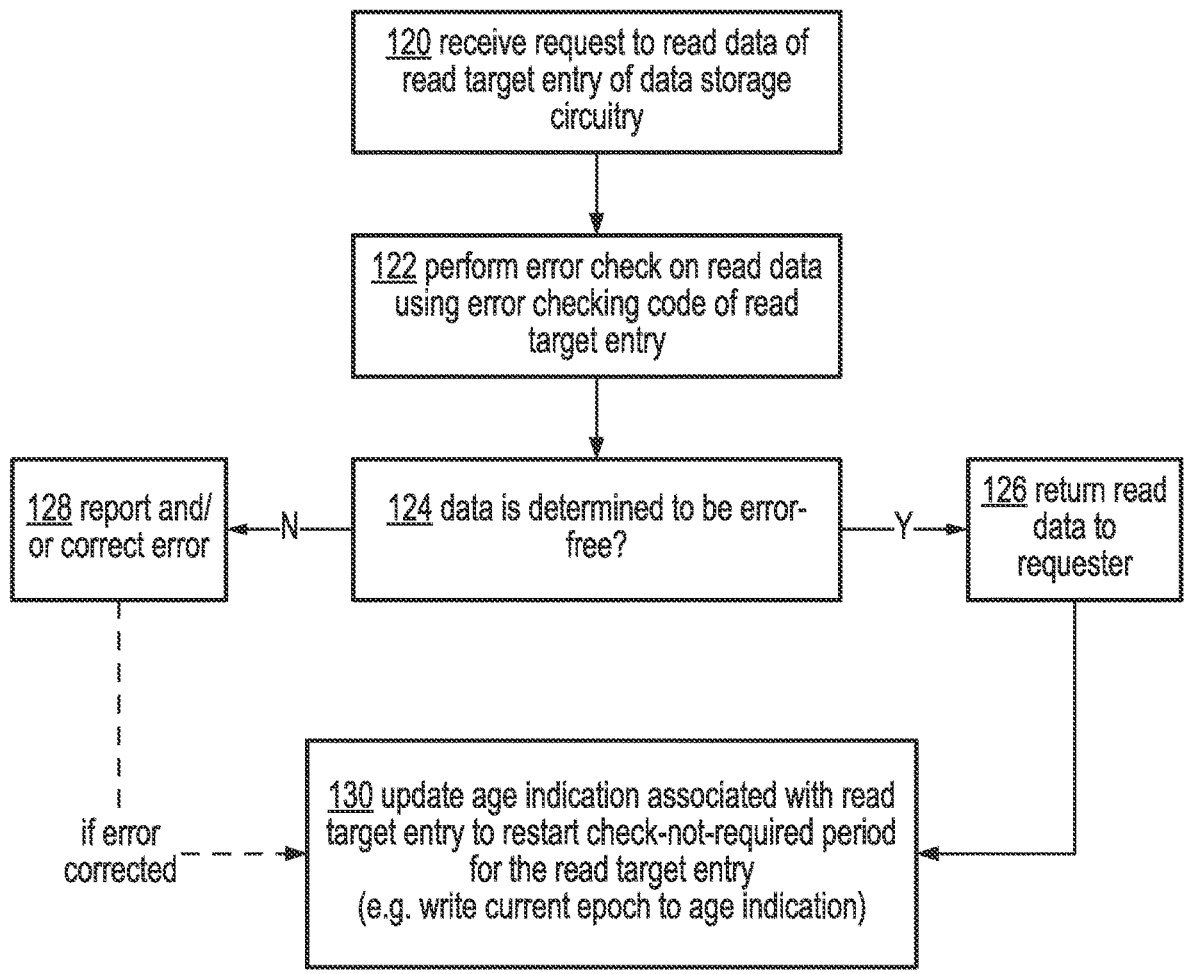
FIG. 7 illustrates a method of processing a request to read data from a target entry of the data storage circuitry.

FIG. 7 is a flow diagram illustrating a method of processing a request which causes data of a read target entry to be read non-destructively from the data storage circuitry 3. This could be a demand read request issued by a requester (e.g. the CPU 22 or GPU 32) to request access to data stored in the data storage circuitry 3, or could be other types of request such as a coherency message causing a lookup of coherency state information included within the data 5 of a given entry 4, or a cache maintenance request to lookup the tag included within the data of a cache entry to determine whether cached information for a given address is present in that entry. In response to receipt of such a request at step 120, at step 122 the access control circuitry 9 reads out the data 5 and error checking code 6 of the read target entry (an entry corresponding to the address specified by the request), and performs an error check using the data 5 and the error checking code 6. At step 124, the access control circuitry 9 determines based on the error check whether the data 5 is error-free. If so, then at step 126 the read data 5 from the read target entry 4 can be returned to the requester. If the data is determined in the error check to be erroneous then at step 128 the error is reported and/or corrected (if possible, given the nature of the error and the type of error checking code used). If the error can be corrected it may not be necessary to report occurrence of the error, as the error can be silently fixed. If error is reported, this can be done in various ways, such as by signalling an exception 15 or fault condition, or by updating an error log.

At least if the data is determined in the error check to be error-free, at step 130 the age indication associated with the read target entry is updated by the access control circuitry 9, to restart the check-not-required period for the read target entry. Again, this can be done by writing the current value of the epoch counter 39 to the age indication field 7 of the read target entry.

Optionally, in some cases step 130 can also be performed in the case where an error was identified in the error check. Whether this is acceptable may depend on the nature of the error handling response performed at step 128—e.g. if the error handling response results in the erroneous data being corrected then it may be useful to update the age indication at step 130 despite the occurrence of the error.

If an error is detected but the error is not corrected (e.g. because an error detecting code is used as the error checking code), there can be different ways of handling the error. For example, an interrupt can be signalled, and (optionally) error information can be provided in a software-accessible location (e.g. a system register or a region of memory designated as an error log), which software can use to determine what actions to take in response to the error (e.g. aborting a software process). Another option is to mark the entry as corrupt, so that the fact that the stored entry is corrupt can be signalled to any software that tries to access that entry again later.

Figure 8:
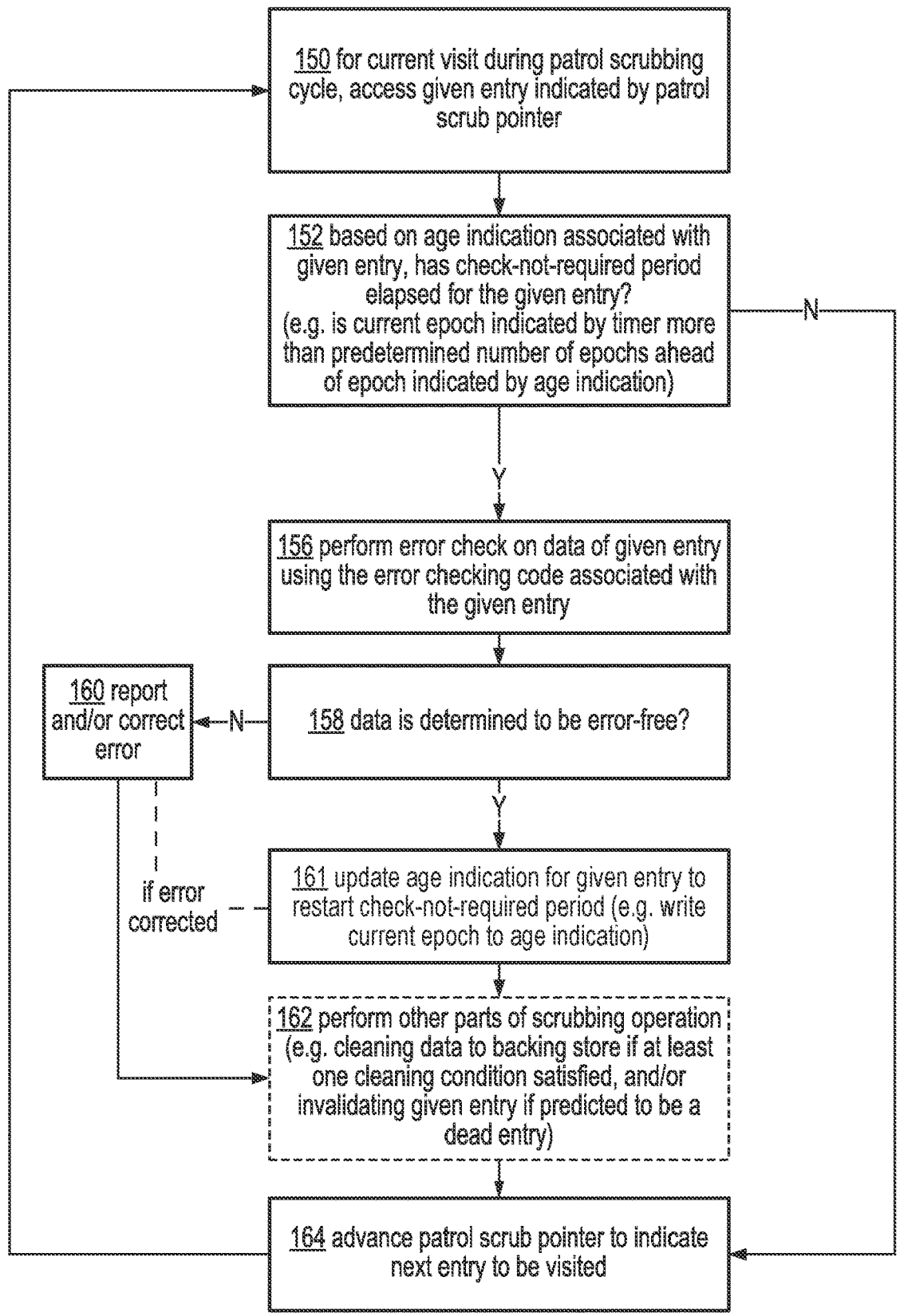
FIG. 8 illustrates a method of performing a patrol scrubbing cycle.

FIG. 8 illustrates a method of performing the patrol scrubbing cycle using the scrubbing circuitry 8. At step 150, for current visit to a given entry during the patrol scrubbing cycle, the scrubbing circuitry 8 accesses the given entry. A patrol scrub pointer is used to track which entry is currently being visited in the patrol scrubbing cycle. Hence, the entry indicated by the current value of the patrol scrub pointer is read, to return the age indication 7 of that entry. At step 152, the scrubbing circuitry 8 determines, based on the age indication 7 associated with the given entry, whether the check-not-required period has elapsed for the given entry. For example, this could be based on whether the current epoch indicated by the epoch counter 39 of the timer 38 is more than a predetermined number of epochs ahead of the epoch indicated by the age indication 7. If the check-not-required period has elapsed for the given entry, then at step 156 the scrubbing circuitry 8 performs an error check on the data 5 of the given entry being scrubbed, using the error checking code 6 associated with that entry. At step 158, based on the error check, the scrubbing circuitry 8 determines whether the data is error-free, and if not then the error is reported and/or corrected at step 160, similar to step 128 of FIG. 7. If the data is determined to be error-free at step 158, or if an error is detected but at step 160 the error is corrected using the ECC 6, then at step 161 the age indication 7 of the given entry is updated to restart the check-not-required period (e.g. by copying the current epoch indication tracked by the epoch counter 39 to the age indication field 7 of the given entry being scrubbed). If the error is not correctable, one of the measures discussed above (marking the entry as corrupt, and/or signalling an interrupt) can be taken.

Optionally, other parts of the scrubbing operation can be performed at step 162, e.g. cleaning of data to a backing store if at least one cleaning condition is satisfied, and/or evicting a given entry if it is predicted to be a dead entry not recently accessed by a demand read/write request issued by a requester (or marking the entry as preferred for eviction).

On the other hand, if at step 152 it was determined, based on the age indication, that the check-not-required period has not yet elapsed, then the error check steps 156, 158 can be omitted, so that it is not necessary to read the data 5 or error checking code 6 of the given entry, saving energy. In an implementation which combines the error check with other scrubbing operations such as cleaning or deadblock prediction as at step 162, such operations could also be skipped in the case where the check-not-required period has not yet elapsed.

Regardless of whether the error check was performed or is omitted, once the scrubbing operation is complete for the given entry, at step 164 the patrol scrub pointer is advanced to indicate the next entry to be visited, and the method returns to step 150 to perform the scrubbing operation for the next entry.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An apparatus comprising:
   data storage circuitry comprising a plurality of entries to store data according to a data storage technology supporting non-destructive reads of data storable in the plurality of entries, each entry associated with an error checking code and an age indication;
   access control circuitry to control access to the data storage circuitry; and
   scrubbing circuitry to perform a patrol scrubbing cycle to visit each entry of the data storage circuitry within a scrubbing period, where on a given visit to a given entry, the scrubbing circuitry is configured to perform a scrubbing operation comprising:
      determining, based on the age indication associated with the given entry, whether a check-not-required period has elapsed for the given entry;
      in response to determining that the check-not-required period has elapsed for the given entry, performing an error check on the data of the given entry using the error checking code associated with the given entry; and
      in response to determining that the check-not-required period has not yet elapsed for the given entry, omitting the error check for the given visit to the given entry; wherein:
   in response to a request causing an update to the data and the error checking code of a write target entry of the data storage circuitry, the access control circuitry is configured to update the age indication associated with the write target entry to restart the check-not-required period for the write target entry; and
   in response to a request causing the data of a read target entry to be read non-destructively and subject to the error check, at least when the data of the read target entry is determined to be error-free based on the error checking code of the read target entry, the access control circuitry is configured to update the age indication associated with the read target entry to restart the check-not-required period for the read target entry.

2. The apparatus of clause 1, wherein the data storage circuitry is a cache.

3. The apparatus of clause 1 or 2, wherein the data storage circuitry comprises a first set of storage circuit locations to store at least the data and the error checking code of each entry according to a first data storage technology for which loss of stored data due to a retention failure is a stochastic process.

4. The apparatus of clause 3, wherein the first data storage technology comprises MRAM (magnetoresistive random access memory) storage technology.

5. The apparatus of any one of clauses 1 to 4, wherein the data storage circuitry comprises:
   a first set of storage circuit locations to store at least the data and the error checking code of each entry, and
   a second set of storage circuit locations to store at least the age indication of each entry, wherein compared to the first set of storage circuit locations, the second set of storage circuit locations has at least one of a reduced access latency and a reduced read access energy cost.

6. The apparatus according to clause 5, wherein the first set of storage circuit locations and the second set of storage circuit locations use a same data storage technology but have different physical design parameters providing at least one of different access latency and different read access energy cost.

7. The apparatus of clause 5, wherein the second set of storage circuit locations use a second data storage technology different to a first data storage technology used for the first set of storage circuit locations.

8. The apparatus of clause 7, wherein the second data storage technology is SRAM (static random access memory).

9. The apparatus of any one of clauses 1 to 8, comprising a timer to provide a current time indication;
   wherein, to restart the check-not-required period for an entry of the data storage circuitry, the access control circuitry is configured to update the age indication of that entry to specify the current time indication provided by the timer.

10. The apparatus of clause 9, wherein the scrubbing circuitry is configured to determine whether the check-not-required period has elapsed for the given entry based on a comparison of the age indication for the given entry and the current time indication provided by the timer.

11. The apparatus of clause 9 or 10, wherein the current time indication is a coarse time indication comprising at least one bit indicative of a current epoch of time.

12. The apparatus of clause 11, wherein the scrubbing circuitry is configured to determine that the check-not-required period has elapsed for the given entry when the current epoch of time indicated by the current time indication is more than a predetermined number of epochs ahead of an epoch indicated by the age indication for the given entry.

13. The apparatus of clause 11 or 12, wherein the timer is configured to update the current epoch of time indicated by the current time indication at a given update frequency whereby a period between two successive instances of the timer setting the current time indication to a given epoch value is an epoch cycle period with a duration greater than or equal to twice the scrubbing period.

14. The apparatus of any one of clauses 11 to 13, wherein the timer is configured to update the current epoch of time indicated by the current time indication with a given update frequency which is variable depending on at least one operating condition of the data storage circuitry.

15. The apparatus of clause 14, wherein the at least one operating condition comprises temperature.

16. The apparatus of any one of clauses 1 to 15, wherein the scrubbing operation also comprises performing, when at least one cache cleaning condition is satisfied, a cleaning operation to write back data of the given entry to a backing store.

17. The apparatus of clause 16, wherein the at least one cache cleaning condition comprises at least one of:
   a dirty condition dependent on whether the data of the given entry is dirty;
   an age indication condition dependent on whether the age indication associated with the given entry indicates that the check-not-required period has elapsed for the given entry;
   an error check condition dependent on whether the data of the given entry is determined to be error-free based on the error checking code;
   a bandwidth condition dependent on current utilisation of bandwidth on a data path between the data storage circuitry and the backing store; and
   a usage prediction condition dependent on a prediction of whether the data of the given entry is likely to be required for servicing a future request.

18. The apparatus of any one of clauses 1 to 17, wherein the scrubbing operation also comprises evicting the given entry or marking the given entry as preferred for eviction, in response to a prediction that the given entry is predicted to be a dead entry.

19. A non-transitory storage medium storing computer-readable code for fabrication of an apparatus comprising:
   data storage circuitry comprising a plurality of entries to store data according to a data storage technology supporting non-destructive reads of data storable in the plurality of entries, each entry associated with an error checking code and an age indication;
   access control circuitry to control access to the data storage circuitry; and
   scrubbing circuitry to perform a patrol scrubbing cycle to visit each entry of the data storage circuitry within a scrubbing period, where on a given visit to a given entry, the scrubbing circuitry is configured to perform a scrubbing operation comprising:
      determining, based on the age indication associated with the given entry, whether a check-not-required period has elapsed;
      in response to determining that the check-not-required period has elapsed for the given entry, performing an error check on the data of the given entry using the error checking code associated with the given entry; and
      in response to determining that the check-not-required period has not yet elapsed for the given entry, omitting the error check for the given visit to the given entry; wherein:
   in response to a request causing an update to the data and the error checking code of a write target entry of the data storage circuitry, the access control circuitry is configured to update the age indication associated with the write target entry to restart the check-not-required period for the write target entry; and
   in response to a request causing the data of a read target entry to be read non-destructively and subject to the error check, at least read when the data of the read target entry is determined to be error-free based on the error checking code of the read target entry, the access control circuitry is configured to update the age indication associated with the read target entry to restart the check-not-required period for the read target entry.

20. A method comprising:
   storing data in a plurality of entries of data storage circuitry according to a data storage technology supporting non-destructive reads of data storable in the plurality of entries, each entry associated with an error checking code and an age indication;
   performing a patrol scrubbing cycle to visit each entry of the data storage circuitry within a scrubbing period, where on a given visit to a given entry, a scrubbing operation is performed comprising:
      determining, based on the age indication associated with the given entry, whether a check-not-required period has elapsed;
      in response to determining that the check-not-required period has elapsed for the given entry, performing an error check on the data of the given entry using the error checking code associated with the given entry; and
      in response to determining that the check-not-required period has not yet elapsed for the given entry, omitting the error check for the given visit to the given entry;
   in response to a request causing an update to the data and the error checking code of a write target entry of the data storage circuitry, updating the age indication associated with the write target entry to restart the check-not-required period for the write target entry; and
   in response to a request causing the data of a read target entry to be read non-destructively and subject to the error check, at least when the data of the read target entry is determined to be error-free based on the error checking code of the read target entry, updating the age indication associated with the read target entry to restart the check-not-required period for the read target entry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
   data storage circuitry comprising a plurality of entries to store data according to a data storage technology supporting non-destructive reads of data storable in the plurality of entries, each entry associated with an error checking code and an age indication;
   access control circuitry to control access to the data storage circuitry; and
   scrubbing circuitry to perform a patrol scrubbing cycle to visit each entry of the data storage circuitry within a scrubbing period, where on a given visit to a given entry, the scrubbing circuitry is configured to perform a scrubbing operation comprising:
      determining, based on the age indication associated with the given entry, whether a check-not-required period has elapsed for the given entry;
      in response to determining that the check-not-required period has elapsed for the given entry, performing an error check on the data of the given entry using the error checking code associated with the given entry; and
      in response to determining that the check-not-required period has not yet elapsed for the given entry, omitting the error check for the given visit to the given entry; wherein:

in response to a request causing an update to the data and the error checking code of a write target entry of the data storage circuitry, the access control circuitry is configured to update the age indication associated with the write target entry to restart the check-not-required period for the write target entry; and in response to a request causing the data of a read target entry to be read non-destructively and subject to the error check, at least when the data of the read target entry is determined to be error-free based on the error checking code of the read target entry, the access control circuitry is configured to update the age indication associated with the read target entry to restart the check-not-required period for the read target entry.

2. The apparatus of claim 1, wherein the data storage circuitry is a cache.

3. The apparatus of claim 1, wherein the data storage circuitry comprises a first set of storage circuit locations to store at least the data and the error checking code of each entry according to a first data storage technology for which loss of stored data due to a retention failure is a stochastic process.

4. The apparatus of claim 3, wherein the first data storage technology comprises MRAM (magnetoresistive random access memory) storage technology.

5. The apparatus of claim 1, wherein the data storage circuitry comprises:
a first set of storage circuit locations to store at least the data and the error checking code of each entry, and
a second set of storage circuit locations to store at least the age indication of each entry, wherein compared to the first set of storage circuit locations, the second set of storage circuit locations has at least one of a reduced access latency and a reduced read access energy cost.

6. The apparatus according to claim 5, wherein the first set of storage circuit locations and the second set of storage circuit locations use a same data storage technology but have different physical design parameters.

7. The apparatus of claim 5, wherein the second set of storage circuit locations use a second data storage technology different to a first data storage technology used for the first set of storage circuit locations.

8. The apparatus of claim 7, wherein the second data storage technology is SRAM (static random access memory).

9. The apparatus of claim 1, comprising a timer to provide a current time indication;
wherein, to restart the check-not-required period for an entry of the data storage circuitry, the access control circuitry is configured to update the age indication of that entry to specify the current time indication provided by the timer.

10. The apparatus of claim 9, wherein the scrubbing circuitry is configured to determine whether the check-not-required period has elapsed for the given entry based on a comparison of the age indication for the given entry and the current time indication provided by the timer.

11. The apparatus of claim 9, wherein the current time indication is a coarse time indication comprising at least one bit indicative of a current epoch of time.

12. The apparatus of claim 11, wherein the scrubbing circuitry is configured to determine that the check-not-required period has elapsed for the given entry when the current epoch of time indicated by the current time indication is more than a predetermined number of epochs ahead of an epoch indicated by the age indication for the given entry.

13. The apparatus of claim 11, wherein the timer is configured to update the current epoch of time indicated by the current time indication at a given update frequency whereby a period between two successive instances of the timer setting the current time indication to a given epoch value is an epoch cycle period with a duration greater than or equal to twice the scrubbing period.

14. The apparatus of claim 11, wherein the timer is configured to update the current epoch of time indicated by the current time indication with a given update frequency which is variable depending on at least one operating condition of the data storage circuitry.

15. The apparatus of claim 14, wherein the at least one operating condition comprises temperature.

16. The apparatus of claim 1, wherein the scrubbing operation also comprises performing, when at least one cache cleaning condition is satisfied, a cleaning operation to write back data of the given entry to a backing store.

17. The apparatus of claim 16, wherein the at least one cache cleaning condition comprises at least one of:
a dirty condition dependent on whether the data of the given entry is dirty;
an age indication condition dependent on whether the age indication associated with the given entry indicates that the check-not-required period has elapsed for the given entry;
an error check condition dependent on whether the data of the given entry is determined to be error-free based on the error checking code;
a bandwidth condition dependent on current utilisation of bandwidth on a data path between the data storage circuitry and the backing store; and
a usage prediction condition dependent on a prediction of whether the data of the given entry is likely to be required for servicing a future request.

18. The apparatus of claim 1, wherein the scrubbing operation also comprises evicting the given entry or marking the given entry as preferred for eviction, in response to a prediction that the given entry is predicted to be a dead entry.

19. A method comprising:
storing data in a plurality of entries of data storage circuitry according to a data storage technology supporting non-destructive reads of data storable in the plurality of entries, each entry associated with an error checking code and an age indication;
performing a patrol scrubbing cycle to visit each entry of the data storage circuitry within a scrubbing period, where on a given visit to a given entry, a scrubbing operation is performed comprising:
determining, based on the age indication associated with the given entry, whether a check-not-required period has elapsed;
in response to determining that the check-not-required period has elapsed for the given entry, performing an error check on the data of the given entry using the error checking code associated with the given entry; and
in response to determining that the check-not-required period has not yet elapsed for the given entry, omitting the error check for the given visit to the given entry;
in response to a request causing an update to the data and the error checking code of a write target entry of the data storage circuitry, updating the age indication associated with the write target entry to restart the check-not-required period for the write target entry; and in response to a request causing the data of a read target entry to be read non-destructively and subject to the error check, at least when the data of the read target entry is determined to be error-free based on the error checking code of the read target entry, updating the age indication associated with the read target entry to restart the check-not-required period for the read target entry.

* * * * *